US012657330B2

(12) United States Patent　　(10) Patent No.:　US 12,657,330 B2

Li　　(45) Date of Patent:　Jun. 16, 2026

(54) ACCESS CONTROL OF MANAGED CLUSTERS PERFORMING DATA PROCESSING ON CLOUD PLATFORMS

(71) Applicant: Databricks, Inc., San Francisco, CA (US)

(72) Inventor: Nong Li, San Francisco, CA (US)

(73) Assignee: Databricks, Inc., San Francisco, CA (US)

( * ) Notice:　Subject to any disclaimer, the term of this patent is extended or adjusted under 35 U.S.C. 154(b) by 174 days.

(21) Appl. No.: 18/593,794

(22) Filed:　Mar. 1, 2024

(65)　　Prior Publication Data

US 2025/0278508 A1　Sep. 4, 2025

(51) Int. Cl.
*G06F 21/62*　(2013.01)
*G06F 16/2453*　(2019.01)

(52) U.S. Cl.
CPC .... *G06F 21/6227* (2013.01); *G06F 16/24542* (2019.01); *G06F 21/6218* (2013.01); *G06F 21/6209* (2013.01)

(58) Field of Classification Search
CPC ............. G06F 21/6218; G06F 21/6236; G06F 21/6227; G06F 21/6209
See application file for complete search history.

(56)　　References Cited

U.S. PATENT DOCUMENTS

| | | | | | |
|---|---|---|---|---|---|
| 6,085,191 | A * | 7/2000 | Fisher | ................. | G06F 21/6227 |
| | | | | | 707/999.009 |
| 6,820,082 | B1 * | 11/2004 | Cook | ................. | G06F 21/6227 |
| | | | | | 707/999.009 |
| 7,185,192 | B1 * | 2/2007 | Kahn | ................. | G06F 21/6218 |
| | | | | | 707/999.102 |
| 7,200,595 | B2 * | 4/2007 | Dutta | ................. | G06F 21/6227 |
| | | | | | 707/999.009 |
| 7,281,003 | B2 * | 10/2007 | Lei | ................. | G06F 21/6218 |
| | | | | | 707/999.005 |
| 7,310,647 | B2 * | 12/2007 | Lei | ................. | G06F 21/6227 |

(Continued)

OTHER PUBLICATIONS

"Understanding Row Access Policies", obtained online from <https://web.archive.org/web/20230329162704/https://docs.snowflake.com/en/user-guide/security-row-intro>, retrieved on Oct. 18, 2025. (Year: 2023).*

(Continued)

*Primary Examiner* — Zhimei Zhu

(74) *Attorney, Agent, or Firm* — Fenwick & West LLP

(57)　　ABSTRACT

A system manages access control for database queries in accordance with access control policies. The techniques may be used for access control of managed clusters in cloud platforms used for data processing, for example, for MapReduce operations. According to an embodiment, the access control policies are fine grained access control policies that allow a user to access a subset of datasets including data of a dataset. The system receives and compiles a database query to generate a query plan for processing the database query. The query plan includes: one or more data access operators, one or more data processing operators, and one or more access control filters. The system executes the query plan using an executor process and a helper process. The helper process executes a data access operator and a corresponding data access filter and the executor process executes one or more data processing operators.

20 Claims, 9 Drawing Sheets

(56) References Cited

U.S. PATENT DOCUMENTS

| | | | | | |
|---|---|---|---|---|---|
| 7,661,141 | B2* | 2/2010 | Dutta | G06F 21/6227 | 707/693 |
| 7,711,750 | B1* | 5/2010 | Dutta | G06F 21/6227 | 707/999.009 |
| 7,778,998 | B2* | 8/2010 | Gupta | G06F 16/2471 | 707/714 |
| 7,860,875 | B2* | 12/2010 | Bird | G06F 16/24534 | 707/769 |
| 7,865,521 | B2* | 1/2011 | Bird | G06F 21/6227 | 707/999.1 |
| 7,873,660 | B1* | 1/2011 | Wong | G06F 21/6245 | 707/705 |
| 7,958,150 | B2* | 6/2011 | Bird | G06F 16/24534 | 707/785 |
| 8,078,595 | B2* | 12/2011 | King | G06F 21/6227 | 707/694 |
| 8,239,396 | B2* | 8/2012 | Byun | G06F 16/24565 | 707/756 |
| 8,875,249 | B2* | 10/2014 | Ture | G06F 16/951 | 726/28 |
| 8,930,410 | B2* | 1/2015 | Alton | G06F 16/2455 | 707/802 |
| 8,983,985 | B2* | 3/2015 | Chen | G06F 16/221 | 707/765 |
| 9,336,407 | B2* | 5/2016 | Maman | G06F 16/24 | |
| 9,626,452 | B2* | 4/2017 | Rissanen | G06F 16/9032 | |
| 10,127,272 | B2* | 11/2018 | Tremayne | G06F 16/2425 | |
| 10,380,334 | B2* | 8/2019 | Gopi | G06F 21/6227 | |
| 10,592,471 | B2* | 3/2020 | Barbas | G06F 16/162 | |
| 10,713,246 | B2* | 7/2020 | Schukovets | G06F 16/221 | |
| 10,715,524 | B1* | 7/2020 | Paulus | G06F 16/283 | |
| 11,093,633 | B2* | 8/2021 | Jacob | G06F 21/6218 | |
| 11,727,139 | B2* | 8/2023 | Avanes | G06F 21/604 | 711/108 |
| 11,762,970 | B2* | 9/2023 | Yanacek | G06F 16/1774 | 726/1 |
| 11,790,099 | B1* | 10/2023 | Mujumdar | H04L 63/20 | 726/1 |
| 11,868,496 | B1* | 1/2024 | Balakrishnan | G06F 21/6227 | |
| 11,886,431 | B2* | 1/2024 | Bernstein | G06F 16/2455 | |
| 11,899,668 | B2* | 2/2024 | Yamada | G06F 16/24564 | |
| 11,941,151 | B2* | 3/2024 | Mendoza | G06F 21/6254 | |
| 2003/0236781 | A1* | 12/2003 | Lei | G06F 16/24575 | |
| 2003/0236782 | A1* | 12/2003 | Wong | G06F 16/24547 | 707/999.005 |
| 2004/0139043 | A1* | 7/2004 | Lei | G06F 21/6227 | |
| 2007/0208745 | A1* | 9/2007 | Ture | G06F 21/6227 | 707/999.009 |
| 2007/0276835 | A1* | 11/2007 | Murthy | G06F 21/6227 | 707/999.009 |
| 2007/0283425 | A1* | 12/2007 | Ture | G06F 16/951 | 726/5 |
| 2008/0235231 | A1* | 9/2008 | Gass | G06F 21/6227 | 707/999.102 |
| 2011/0302180 | A1* | 12/2011 | Muller | G06F 16/284 | 707/754 |
| 2013/0117313 | A1* | 5/2013 | Miao | G06F 21/6245 | 707/E17.005 |
| 2013/0325841 | A1* | 12/2013 | Ahmed | G06F 21/30 | 707/E17.017 |
| 2015/0150075 | A1* | 5/2015 | Vahlis | H04L 63/0428 | 726/1 |
| 2016/0063271 | A1* | 3/2016 | Bartlett | G06F 21/85 | 726/28 |
| 2016/0335323 | A1* | 11/2016 | Teodorescu | H04L 63/101 | |
| 2017/0277747 | A1* | 9/2017 | Tremayne | H03M 7/60 | |
| 2017/0318058 | A1* | 11/2017 | Vahlis | G06F 16/122 | |
| 2017/0364539 | A1* | 12/2017 | Jacob | G06F 21/6227 | |
| 2018/0357444 | A1* | 12/2018 | Kammath | G06F 21/6227 | |
| 2019/0286832 | A1* | 9/2019 | Szeto | H04W 12/082 | |
| 2020/0250328 | A1* | 8/2020 | Swenson | G06F 21/6218 | |
| 2020/0409968 | A1* | 12/2020 | Chu | G06F 16/21 | |
| 2021/0097194 | A1* | 4/2021 | Khanduja | G06F 16/2433 | |
| 2021/0141920 | A1* | 5/2021 | Khurana | G06F 21/31 | |
| 2021/0303706 | A1* | 9/2021 | Kakui | G06F 21/6245 | |
| 2021/0352076 | A1* | 11/2021 | Wilczynski | H04L 63/104 | |
| 2022/0053028 | A1* | 2/2022 | Vahlis | G06F 16/245 | |
| 2022/0405377 | A1* | 12/2022 | Kakui | G06F 16/2452 | |
| 2023/0177201 | A1* | 6/2023 | Durand | G06F 21/6227 | 726/4 |
| 2024/0086566 | A1* | 3/2024 | Lim | G06F 21/6227 | |
| 2024/0143824 | A1* | 5/2024 | Brenner | G06F 16/245 | |
| 2024/0256681 | A1* | 8/2024 | Rothschild | G06F 21/6218 | |
| 2025/0077699 | A1* | 3/2025 | Ramos | G06F 21/6227 | |
| 2025/0106221 | A1* | 3/2025 | Wang | H04L 63/108 | |
| 2025/0165476 | A1* | 5/2025 | Baptist | G06F 16/2456 | |
| 2025/0294026 | A1* | 9/2025 | Vadlamani | H04L 63/0815 | |

OTHER PUBLICATIONS

Maanak Gupta, Farhan Patwa, and Ravi Sandhu. 2018. An Attribute-Based Access Control Model for Secure Big Data Processing in Hadoop Ecosystem. In Proceedings of the Third ACM Workshop on Attribute-Based Access Control (ABAC'18). Association for Computing Machinery, New York, NY, USA, 13-24. (Year: 2018).*

* cited by examiner

ACCESS CONTROL OF MANAGED CLUSTERS PERFORMING DATA PROCESSING ON CLOUD PLATFORMS

TECHNICAL FIELD

The disclosed configuration relates generally to access control in database systems, and more particularly to access control of managed clusters in cloud platforms used for data processing.

BACKGROUND

Organizations, for example, large enterprises perform large-scale data processing using various techniques such as predictive modeling. Often such data processing is performed in a cloud platform using a cluster of computing systems that execute big data frameworks, for example, Amazon™ EMR (Elastic MapReduce). Big data analysis involves storage of large amount of data as well as significant amount of computing. Performing such computation in a cloud platform has security concerns since cloud platforms often use shared credentials. Data processing often requires fine grained access control, for example, users having access to a subset of rows, or a subset of a column, or access requiring masking of data before providing to the user. As a result, storge level access control is at a coarser level of granularity, for example, at file level and is inadequate for performing such computation using clusters hosted by cloud platforms.

SUMMARY

A system manages access control for database queries in accordance with access control policies. According to an embodiment, the access control policies are fine grained access control policies that allow a user to access a subset of datasets including data of a dataset. The data of a dataset may be stored in a file. The system receives a database query for processing data obtained from one or more dataset. The system compiles the database query to generate a query plan for processing the database query in accordance with an access control policy. The query plan includes: (1) one or more data access operators, (2) one or more data processing operators, and (3) one or more access control filters. A data access operator is configured to access a dataset of the database. A data processing operator is configured to process at least a subset of data accessed by a data access operator. An access control filter determines a subset of data accessed by a data access operator according to the access control policy and provides the subset of data as input to a data processing operator. The system executes the query plan using an executor process and a helper process. The helper process executes a data access operator and a corresponding data access filter, and the executor process executes one or more data processing operators. Accordingly, the helper process accesses the data and by executing the data access operator, filters the data using the access control filter to determine a subset of data that the user is allowed to access according to the access control policy. The system provides the subset of data to the executor process. The executor process may execute the data processing operators of the query plan to determine the result of the database query which may be provided to a client associated with the user that sent the database query.

According to an embodiment, the system receives an access control policy specification describing the access control policy for accessing a set of datasets by users and generates the one or more access control filters according to the access control policy specification.

According to an embodiment, the access control policy specification includes a condition based on an attribute of a first dataset processed by the database query. The system generates an access control filter that processes data of a data access operator processing the first dataset. The access control filter is configured to determine a subset of data of the dataset according to the condition based on the attribute of the first dataset. For example, the condition may be a boolean expression based on the attribute and the access control filter includes instructions to filter the data based on the boolean expression.

According to an embodiment, the data accessed by a data access operator configured to access a dataset is provided to a data processing operator without an access control filter if the access control policy specification does not include any condition based on attributes of that dataset.

According to an embodiment, the executor process and the helper process are prevented from accessing the one or more datasets processed by the database query before executing the query plan. The system provides temporary credentials to the helper process for accessing datasets processed by the database query for executing the query plan, wherein the temporary credentials provide access to more data of a dataset than is permitted by the access control policy.

According to an embodiment, the helper process provides the subset of data of the dataset obtained by executing the data access operator and the corresponding data access filter to the executor process using an interprocess communication mechanism.

According to an embodiment, the steps described herein are executed as a process. According to an embodiment, a non-transitory computer readable storage medium comprising stored program code including instructions that when executed by one or more computer processors, cause the one or more computer processors to perform the steps of the methods described herein. Other embodiments include computer systems that include one or more processors and a non-transitory computer readable storage medium comprising stored program code including instructions that when executed by the one or more computer processors, cause the one or more computer processors to perform the steps of the methods described herein.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
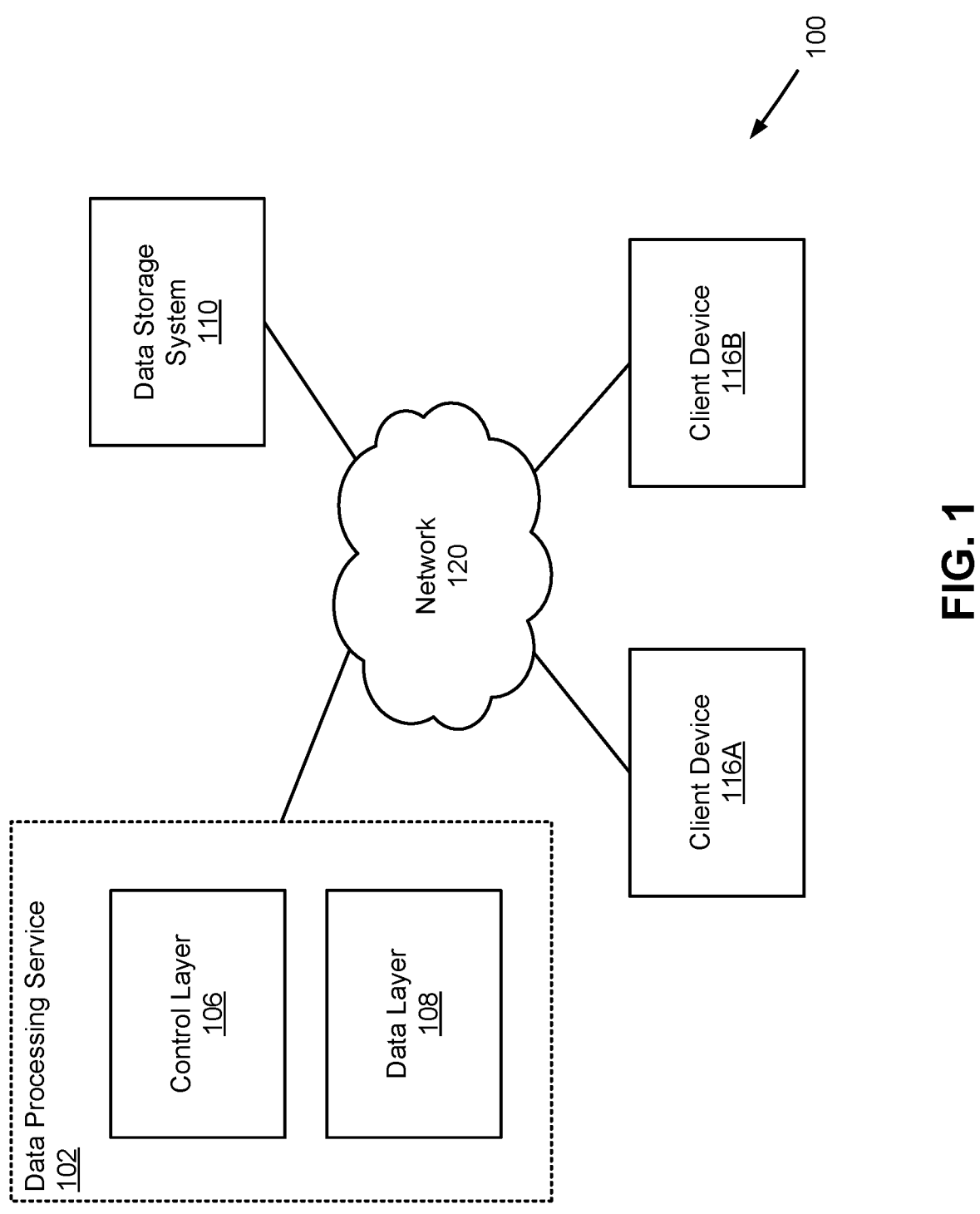
FIG. 1 is a high-level block diagram of a system environment for a data processing service, in accordance with an embodiment.

The figures depict various embodiments of the present configuration for purposes of illustration only. One skilled in the art will readily recognize from the following discussion that alternative embodiments of the structures and methods illustrated herein may be employed without departing from the principles of the configuration described herein.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

A data processing service performs data processing using a cluster of computing systems. Examples of such data processing performed include processing for performing data analytics, for example, MapReduce operations such as operations performed using Amazon Elastic MapReduce (EMR, a cloud big data platform for data processing, interactive analysis, and machine learning using open-source frameworks such as Apache Spark, Apache Hive, and Presto). The system uses cloud platform for performing the processing. As a result, the processing is performed using shared resources, for example, shared processes or shared virtual machine s (VM). The system supports fine grained data access control, for example, access to a subset of rows, access to a subset of columns, access requiring masking of a sensitive information, and so on. Accordingly, the process performing the data processing needs fine grained access control. Such fine grained access control may be implemented by defining specific conditions based on data or metadata attributes. An example of fine-grained access control policy is that a user has access to all rows that satisfy a condition based on one or more attributes, for example, all rows having state="California". As another example, a user may not have access to data that is tagged as PII (personally identifiable information). As another example, a user is given access to data that is tagged as PII, but the data must be masked before providing to the user.

The data platform or the computing system on which the process is executed, for example, the computing systems of a cloud platform may use data storage level security that allows access at a coarser granularity, for example, at the file level. If the process uses the coarse-grained access control mechanisms of the underlying platform, the process has access to more data than allowed under the fine-grained access control policy. This may result in security violations. For example, a malicious actor may access information that the malicious actor is not authorized to access, or a process may accidentally modify or delete data (for example, due to a defect in the code) that the process is not authorized to access. As a result, enforcing fine grained data security for performing such data processing in a shared processing environment is challenging.

A system may address this problem by running multiple clusters or using separate sets of nodes to run processes that have different access control requirements. For example, a set S1 of nodes can run one process or a set of processes and another set S2 of nodes may run different set of processes that have different access control requirements. Such techniques do not utilize the computing resources efficiently and may require utilizing more resources than needed for a performing a set of data processing tasks. In contrast, the disclosed techniques allow enforcement of fine-grained data security for performing such data processing efficiently in a shared processing environment.

FIG. 1 is a high-level block diagram of a system environment 100 for a data processing service 102, in accordance with an embodiment. The system environment 100 shown by FIG. 1 includes one or more client devices 116A, 116B, a network 120, a data processing service 102, and a data storage system 110. In alternative configurations, different and/or additional components may be included in the system environment 100. The computing systems of the system environment 100 may include some or all of the components (systems (or subsystems)) of a computer system 900 as described with FIG. 9.

The data processing service 102 is a service for managing and coordinating data processing services (e.g., database services) to users of client devices 116. The data processing service 102 may manage one or more applications that users of client devices 116 can use to communicate with the data processing service 102. Through an application of the data processing service 102, the data processing service 102 may receive requests (e.g., database queries) from users of client devices 116 to perform one or more data processing functionalities on data stored, for example, in the data storage system 110. The requests may include query requests, analytics requests, or machine learning and artificial intelligence requests, and the like, on data stored by the data storage system 110. The data processing service 102 may provide responses to the requests to the users of the client devices 116 after they have been processed.

In one embodiment, as shown in the system environment 100 of FIG. 1, the data processing service 102 includes a control layer 106 and a data layer 108. The components of the data processing service 102 may be configured by one or more servers and/or a cloud infrastructure platform. In one embodiment, the control layer 106 receives data processing requests and coordinates with the data layer 108 to process the requests from client devices 116. The control layer 106 may schedule one or more jobs for a request or receive requests to execute one or more jobs from the user directly through a respective client device 116. The control layer 106 may distribute the jobs to components of the data layer 108 where the jobs are executed.

The control layer 106 is additionally capable of configuring the clusters in the data layer 108 that are used for executing the jobs. For example, a user of a client device 116 may submit a request to the control layer 106 to perform one or more queries and may specify that four clusters on the data layer 108 be activated to process the request with certain memory requirements. Responsive to receiving this information, the control layer 106 may send instructions to the data layer 108 to activate the requested number of clusters and configure the clusters according to the requested memory requirements.

The data layer 108 includes multiple instances of clusters of computing resources that execute one or more jobs received from the control layer 106. Accordingly, the data layer 108 may include a cluster computing system for executing the jobs. An example of a cluster computing system is described in relation to FIG. 4. In one instance, the clusters of computing resources are virtual machines or virtual data centers configured on a cloud infrastructure platform. In one instance, the control layer 106 is configured as a multi-tenant system and the data layers 108 of different tenants are isolated from each other. In one instance, a serverless implementation of the data layer 108 may be configured as a multi-tenant system with strong virtual machine (VM) level tenant isolation between the different tenants of the data processing service 102. Each customer represents a tenant of a multi-tenant system and shares software applications and also resources such as databases of the multi-tenant system. Each tenant's data is isolated and remains invisible to other tenants. For example, a respective data layer instance can be implemented for a respective tenant. However, it is appreciated that in other embodiments, single tenant architectures may be used.

The data layer 108 thus may be accessed by, for example, a developer through an application of the control layer 106 to execute code developed by the developer. In one embodiment, a cluster in a data layer 108 may include multiple worker nodes that execute multiple jobs in parallel. Responsive to receiving a request, the data layer 108 divides the cluster computing job into a set of worker jobs, provides each of the worker jobs to a worker node, receives worker job results, stores job results, and the like. The data layer 108 may include resources not available to a developer on a local development system, such as powerful computing resources to process very large data sets. In this manner, when the data processing request can be divided into jobs that can be executed in parallel, the data processing request can be processed and handled more efficiently with shorter response and processing time.

The data storage system 110 includes a device (e.g., a disc drive, a hard drive, a semiconductor memory) used for storing database data (e.g., a stored data set, portion of a stored data set, data for executing a query). In one embodiment, the data storage system 110 includes a distributed storage system for storing data and may include a commercially provided distributed storage system service. Thus, the data storage system 110 may be managed by a separate entity than an entity that manages the data processing service 102 or the data management system 110 may be managed by the same entity that manages the data processing service 102.

The client devices 116 are computing devices that display information to users and communicates user actions to the systems of the system environment 100. While two client devices 116A, 116B are illustrated in FIG. 1, in practice many client devices 116 may communicate with the systems of the system environment 100. In one embodiment, client devices 116 of the system environment 100 may include some or all of the components (systems (or subsystems)) of a computer system 900 as described with FIG. 9.

In one embodiment, a client device 116 executes an application allowing a user of the client device 116 to interact with the various systems of the system environment 100 of FIG. 1. For example, a client device 116 can execute a browser application to enable interaction between the client device 116 and the data processing service 102 via the network 120. In another embodiment, the client device 116 interacts with the various systems of the system environment 100 through an application programming interface (API) running on a native operating system of the client device 116, such as IOS® or ANDROID™.

According to an embodiment, the data processing service 102 receives a database query from a client associated with a user. The user has access to data of the database in accordance with an access control policy, for example, a fine-grained access control policy that provides one or more of row level access, column level access, or masked access to specific subsets of data. The data processing service 102 generates a query plan that incorporates filters that implement a fine-grained access control policy. The query plan is a graph of operators where an operator may process data and provide the processed data to another operator until the final result of the query is generated. The query plan is executed using two types of processes, a sidecar process that executes operators that access the data from the storage system and an executor process that performs the processing of the remaining operators of the database query. The sidecar process is given a short-term token that allows the sidecar process to access the data from the storage system for processing the data access operators. This minimizes the blast radius, i.e., a negative impact of security breaches.

Figure 2:
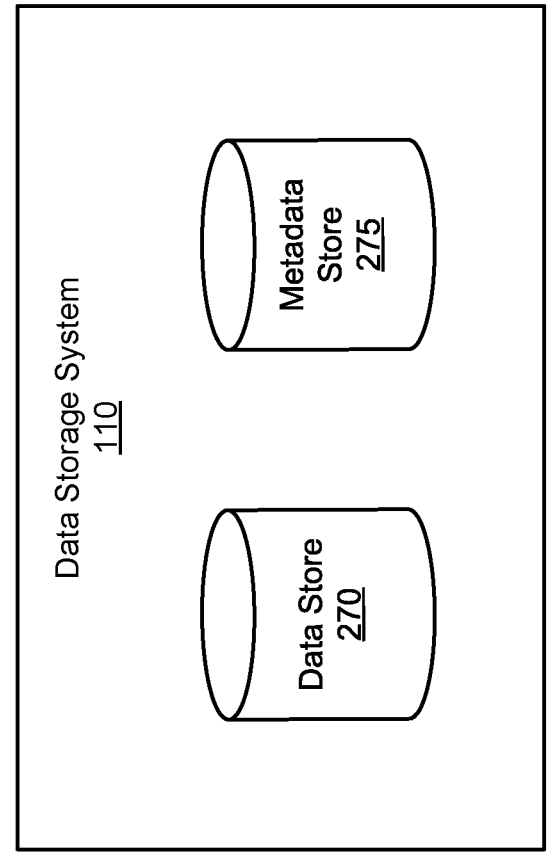
FIG. 2 illustrates a block diagram of an architecture of a data storage system, in accordance with an embodiment.

FIG. 2 is a block diagram of an architecture of a data storage system 108, in accordance with an embodiment. In one embodiment, the data storage system 108 includes a data ingestion module 250. The data storage system 108 also includes a data tables store 270 and a metadata store 275.

The data store 270 stores data associated with different tenants of the data processing service 102. In one embodiment, the data in data store 270 is stored in a format of a data table. A data table may include a plurality of records or instances, where each record may include values for one or more features. The records may span across multiple rows of the data table and the features may span across multiple columns of the data table. In other embodiments, the records may span across multiple columns and the features may span across multiple rows. For example, a data table associated with a security company may include a plurality of records each corresponding to a login instance of a respective user to a website, where each record includes values for a set of features including user login account, timestamp of attempted login, whether the login was successful, and the like. In one embodiment, the plurality of records of a data table may span across one or more data files. For example, a first subset of records for a data table may be included in a first data file and a second subset of records for the same data table may be included in another second data file.

In one embodiment, a data table may be stored in the data store 270 in conjunction with metadata stored in the metadata store 275. In one instance, the metadata includes transaction logs for data tables. Specifically, a transaction log for a respective data table is a log recording a sequence of transactions that were performed on the data table. A transaction may perform one or more changes to the data table that may include removal, modification, and additions of records and features to the data table, and the like. For example, a transaction may be initiated responsive to a request from a user of the client device 116. As another example, a transaction may be initiated according to policies of the data processing service 102. Thus, a transaction may write one or more changes to data tables stored in the data storage system 110.

In one embodiment, a new version of the data table is committed when changes of a respective transaction are successfully applied to the data table of the data storage system 108. Since a transaction may remove, modify, or add data files to the data table, a particular version of the data table in the transaction log may be defined with respect to the set of data files for the data table. For example, a first transaction may have created a first version of a data table defined by data files A and B each having information for a respective subset of records. A second transaction may have then created a second version of the data table defined by data files A, B and in addition, new data file C that include another respective subset of records (e.g., new records) of the data table.

In one embodiment, the transaction log may record each version of the table, the data files associated with a respective version of the data table, information pertaining to the type of transactions that were performed on the data table, the order in which the transactions were performed (e.g., transaction sequence number, a timestamp of the transaction), and an indication of data files that were subject to the transaction, and the like. In some embodiments, the transaction log may include change data for a transaction that also records the changes for data written into a data table with respect to the previous version of the data table. The change data may be at a relatively high level of granularity and may indicate the specific changes to individual records with an indication of whether the record was inserted, deleted, or updated due to the corresponding transaction.

Figure 3:
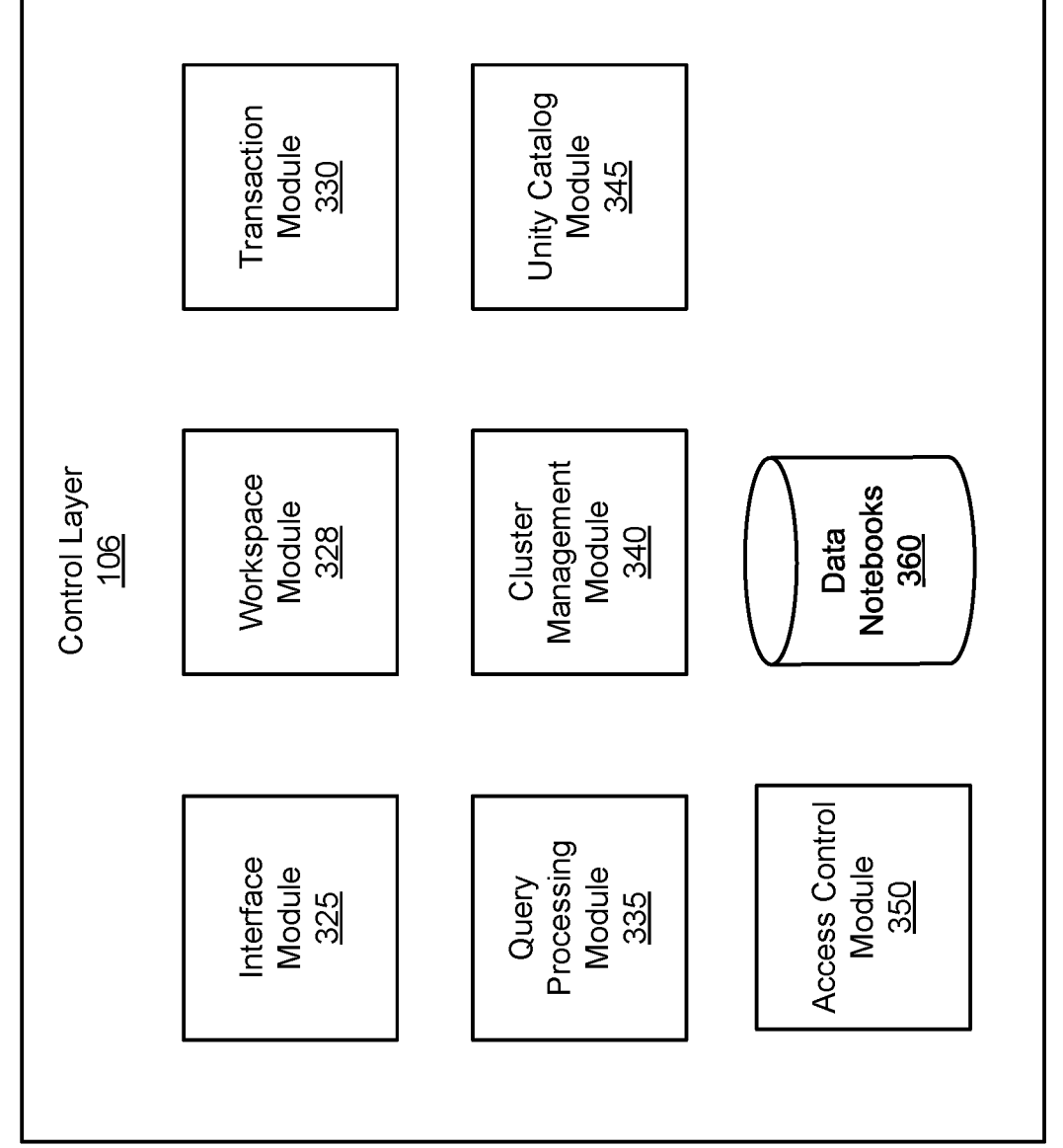
FIG. 3 illustrates a block diagram of an architecture of a control layer, in accordance with an embodiment.

FIG. 3 is a block diagram of an architecture of a control layer 106, in accordance with an embodiment. In one embodiment, the control layer 106 includes an interface module 325, a transaction module 330, a query processing module 335, a cluster management module 340, and an access control module 350. The control layer 106 also includes a data notebook store 360. The modules 325, 330, 335, and 340 may be structured for execution by a computer system, e.g., 900 having some or all of the components as described in FIG. 9, such that the computer system 900 operates in a specified manner as per the described functionality.

The interface module 325 provides an interface and/or a workspace environment where users of client devices 116 (e.g., users associated with tenants) can access resources of the data processing service 102. For example, the user may retrieve information from data tables associated with a tenant, submit data processing requests such as query requests on the data tables, through the interface provided by the interface module 325. The interface provided by the interface module 325 may include notebooks, libraries, experiments, queries submitted by the user. In one embodiment, a user may access the workspace via a user interface (UI), a command line interface (CLI), or through an application programming interface (API) provided by the workspace module 325.

For example, a notebook associated with a workspace environment is a web-based interface to a document that includes runnable code, visualizations, and explanatory text. A user may submit data processing requests on data tables in the form of one or more notebook jobs. The user provides code for executing the one or more jobs and indications such as the desired time for execution, number of cluster worker nodes for the jobs, cluster configurations, a notebook version, input parameters, authentication information, output storage locations, or any other type of indications for executing the jobs. The user may also view or obtain results of executing the jobs via the workspace.

The workspace module 328 deploys workspaces within the data processing service 102. A workspace as defined herein may refer to a deployment in the cloud that functions as an environment for users of the workspace to access assets. An account of the data processing service 102 represents a single entity that can include multiple workspaces. In one embodiment, an account associated with the data processing service 102 may be associated with one workspace. In another embodiment, an account may be associated with multiple workspaces. A workspace organizes objects, such as notebooks, libraries, dashboards, and experiments into folders. A workspace also provides users access to data objects, such as tables or views or functions, and computational resources such as cluster computing systems.

In one embodiment, a user or a group of users may be assigned to work in a workspace. The users assigned to a workspace may have varying degrees of access permissions to assets of the workspace. For example, an administrator of the data processing service 102 may configure access permissions such that users assigned to a respective workspace are able to access all of the assets of the workspace. As another example, users associated with different subgroups may have different levels of access, for example users associated with a first subgroup may be granted access to all data objects while users associated with a second subgroup are granted access to only a select subset of data objects.

The transaction module 330 receives requests to perform one or more transaction operations from users of client devices 116. As described in conjunction in FIG. 2, a request to perform a transaction operation may represent one or more requested changes to a data table. For example, the transaction may be to insert new records into an existing data table, replace existing records in the data table, delete records in the data table. As another example, the transaction may be to rearrange or reorganize the records or the data files of a data table to, for example, improve the speed of operations, such as queries, on the data table. For example, when a particular version of a data table has a significant number of data files composing the data table, some operations may be relatively inefficient. Thus, a transaction operation may be a compaction operation that combines the records included in one or more data files into a single data file.

The query processing module 335 receives and processes queries that access data stored by the data storage system 110. The query processing module 335 may reside in the control layer 106. The queries processed by the query processing module 335 are referred to herein as database queries. The database queries are specified using a declarative database query language such as the SQL. The query processing module 335 compiles a database query specified using the declarative database query language to generate executable code that is executed. The query processing module 335 may encounter runtime errors during execution of a database query and returns information describing the runtime error including an origin of the runtime error representing a position of the runtime error in the database query. In one embodiment, the query processing module 335 provides one or more queries to appropriate clusters of the data layer 108, and receives responses to the queries from clusters in which the queries are executed.

The unity catalog module 345 is a fine-grained governance solution for managing assets within the data processing service 102. It helps simplify security and governance by providing a central place to administer and audit data access. In one embodiment, the unity catalog module 345 maintains a metastore for a respective account. A metastore is a top-level container of objects for the account. The metastore may store data objects and the permissions that govern access to the objects. A metastore for an account can be assigned to one or more workspaces associated with the account. In one embodiment, the unity catalog module 345 organizes data as a three-level namespace, a catalogue is the first layer, a schema (also called a database) is the second layer, and tables and views are the third layer.

In one embodiment, the unity catalog module 345 enables read and write of data to data stored in cloud storage of the data storage system 110 on behalf of users associated with an account and/or workspace. In one instance, the unity catalog module 345 manages storage credentials and external locations. A storage credential represents an authentication and authorization mechanism for accessing data stored on the data storage system 110. Each storage credential may be subject to access-control policies that control which users and groups can access the credential. An external location is an object that combines a cloud storage path (e.g., storage path in the data storage system 110) with a storage credential that authorizes access to the cloud storage path. Each storage location is subject to access-control policies that control which users and groups can access the storage credential. Therefore, if a user does not have access to a storage credential in the unity catalog module 345, the unity catalog module 345 does not attempt to authenticate to the data storage system 110.

In one embodiment, the unity catalog module 345 allows users to share assets of a workspace and/or account with users of other accounts and/or workspaces. For example, users of Company A can configure certain tables owned by Company A that are stored in the data storage system 110 to be shared with users of Company B. Each organization may be associated with separate accounts on the data processing service 102. Specifically, a provider entity can share access to one or more tables of the provider with one or more recipient entities.

Responsive to receiving a request from a provider to share one or more tables (or other data objects), the unity catalog module 345 creates a share in the metastore of the provider. A share is a securable object registered in the metastore for a provider. A share contains tables and notebook files from the provider metastore that the provider would like to share with a recipient. A recipient object is an object that associates an organization with a credential or secure sharing identifier allowing that organization to access one or more shares of the provider. In one embodiment, a provider can define multiple recipients for a given metastore. The unity catalog module 345 in turn may create a provider object in the metastore of the recipient that stores information on the provider and the tables that the provider has shared with the recipient. In this manner, a user associated with a provider entity can securely share tables of the provider entity that are stored in a dedicated cloud storage location in the data storage system 110 with users of a recipient entity by configuring shared access in the metastore.

The access control module 350 receives access control policy specifications and automates and synchronizes the implementation of the access control policy specified in the access control policy specifications across multiple data platforms supported by the data processing service 102. The access control specification may specify access control to a dataset for a user using conditions based on attributes of the dataset. For example, the user may have access to data that has an attribute within a particular range or the attribute having a specific value. For example, the user may have access to data where an attribute representing a state has a value within a specified set of states such as California, Washington, and Oregon. The access control policy may specify that the user has access to certain subset of data after masking the data. For example, the user may have access to data that is tagged as PII (personally identifiable information) provided the data is masked using a masking technique specified in the access control policy.

Figure 4:
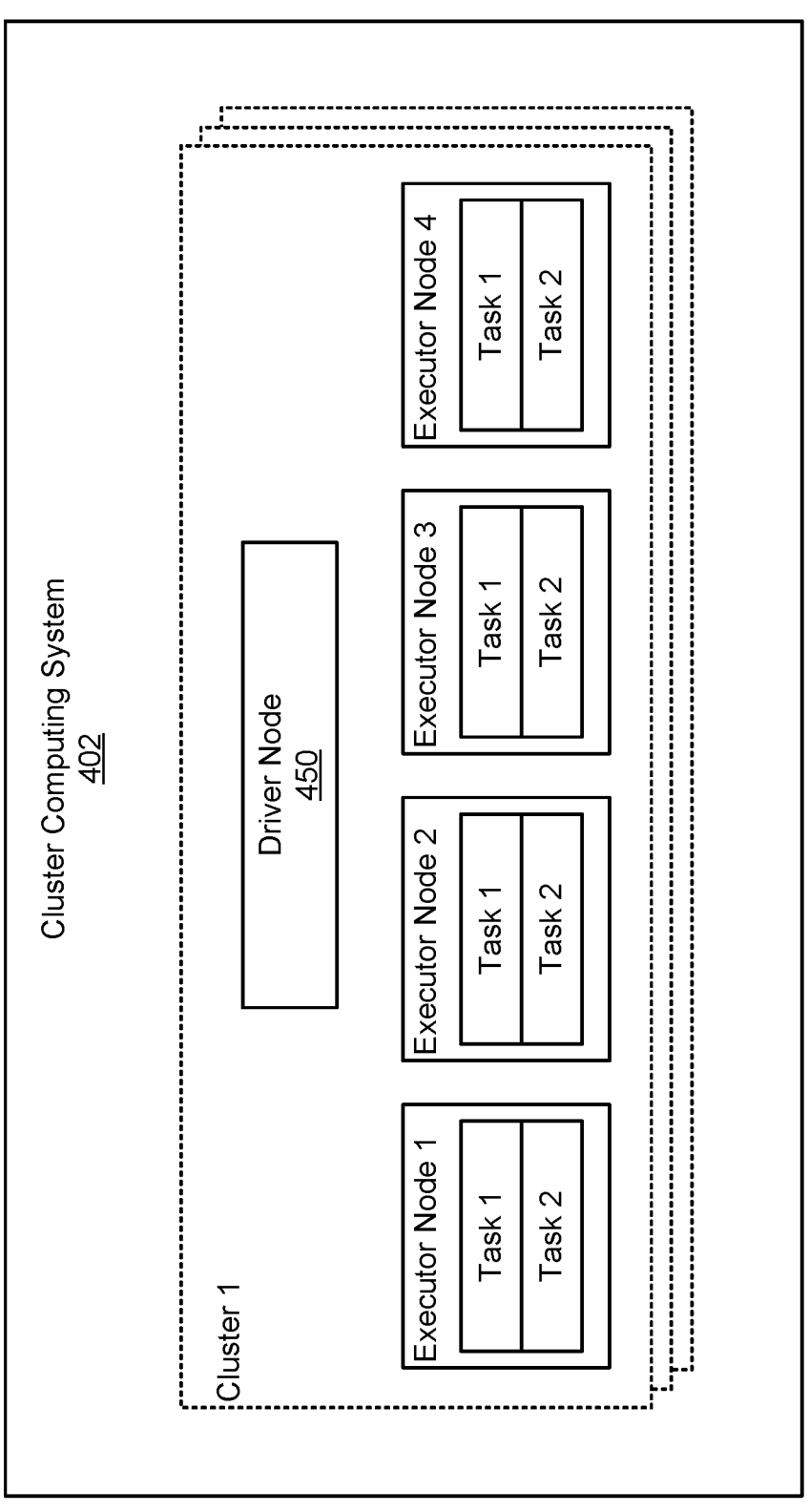
FIG. 4 illustrates a block diagram of an architecture of a cluster computing system of the data layer, in accordance with an embodiment.

FIG. 4 is a block diagram of an architecture of a cluster computing system 402 of the data layer 108, in accordance with an embodiment. In some embodiments, the cluster computing system 402 of the data layer 108 includes driver node 450 and worker pool including multiple executor nodes. The nodes may be structured for execution by a computer system, e.g., 900 having some or all of the components as described in FIG. 9, such that the computer system 900 operates in a specified manner as per the described functionality.

The driver node 450 receives one or more jobs for execution, divides a job into job stages, and provides job stages to executor nodes, receives job stage results from the executor nodes of the worker pool, and assembles job stage results into complete job results, and the like. In one embodiment, the driver node receives a request to execute one or more queries from the query processing module 335. The driver node 450 may compile a database query and generate an execution plan. The driver node 450 distributes the query information including the generated code to the executor nodes. The executor nodes execute the query based on the received information.

The worker pool can include any appropriate number of executor nodes (e.g., 4 executor nodes, 12 executor nodes, 256 executor nodes). Each executor node in the worker pool includes one or more execution engines (not shown) for executing one or more tasks of a job stage. In one embodiment, an execution engine performs single-threaded task execution in which a task is processed using a single thread of the CPU. The executor node distributes one or more tasks for a job stage to the one or more execution engines and provides the results of the execution to the driver node 410. According to an embodiment, an executor node executes the generated code for the database query for a particular subset of data that is processed by the database query. The executor nodes execute the query based on the received information from the driver node 450.

Figure 5:
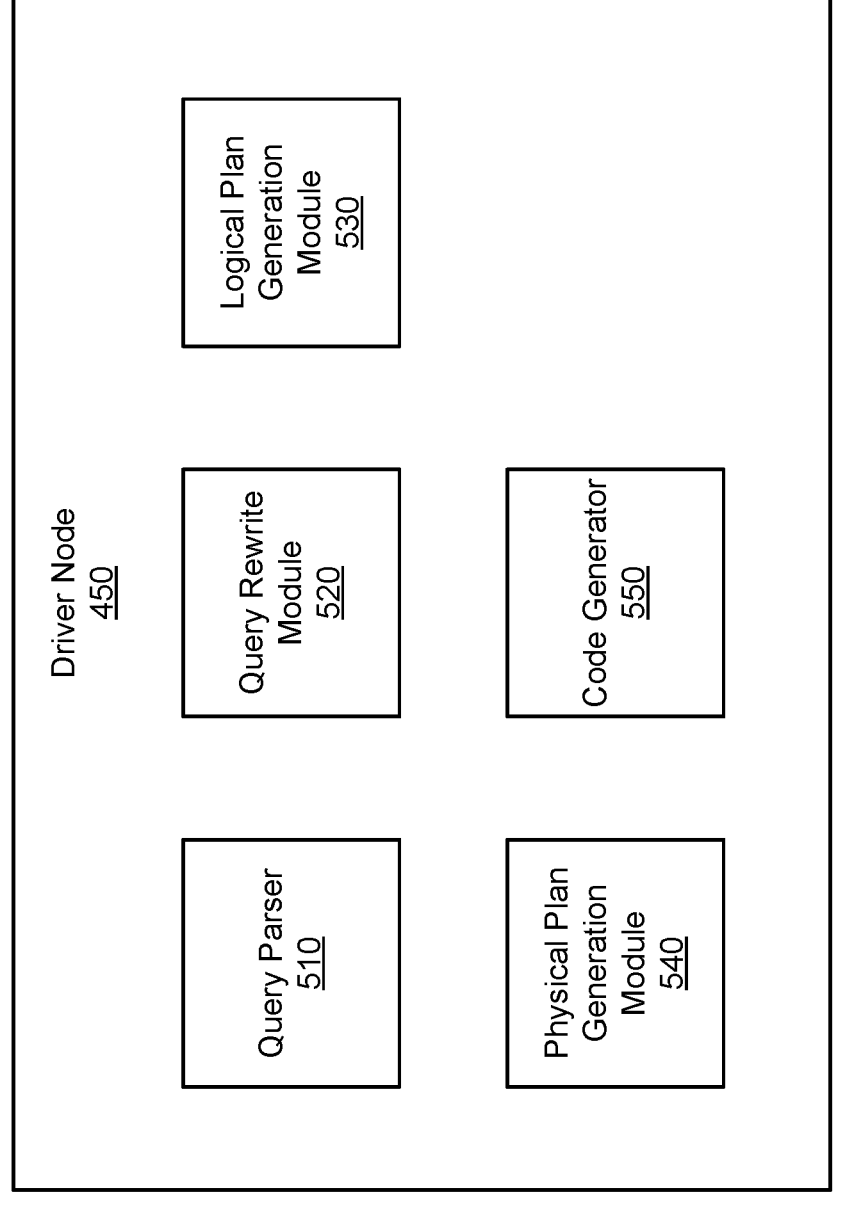
FIG. 5 is a block diagram of an architecture of a driver node, in accordance with an embodiment.

FIG. 5 is a block diagram of an architecture of a driver node 450, in accordance with an embodiment. In one instance, the driver node 450 includes a query parser 510, a query rewrite module 520, a logical plan generation module 530, and a physical plan generation module 540. The modules and nodes may be structured for execution by a computer system, e.g., 900 having some or all of the components as described in FIG. 9, such that the computer system 900 operates in a specified manner as per the described functionality.

The query parser 510 receives a database query for processing and parses the database query. The database query is specified using a declarative database query language such as SQL. The query parser 510 parses the database query to identify various tokens of the database query and build a data structure representation of the database query. The data structure representation identifies various components of the database query, for example, any SELECT expressions that are returned by the database query, tables that are input to the query, a conditional clause of the database query, a group by clause, and so on.

According to an embodiment, the data structure representation of the database query is a graph model based on the database query.

The query rewrite module 520 performs transformations of the database query, for example, to improve the execution of the query. The improvement may be in terms of execution time, memory utilization, or other resource utilization. A database query may process one or more tables that store a significant number of records that are processed by the database query. Since the declarative database query language does not specify the procedure for determining the result of the database query, there are various possible procedures for executing the database query.

The query rewrite module 520 may transform the query to change the order of processing of certain steps, for example, by changing the order in which tables are joined, by changing the order in which certain operations such as filtering of records of a table is performed in relation to other operations. The query rewrite module 520 may transform the database query to cause certain temporary results to be materialized. The query rewrite module 520 may eliminate certain operations if the operations are determined to be redundant. The query rewrite module 520 may transform a database query so that certain computations such as subqueries or expressions are shared. The query rewrite module 520 may transform the database query to pushdown certain computations, for example, by changing the order in which certain predicates are applied to the computation as early as possible. The query rewrite module 520 may transform the database query to modify certain predicates to use more optimized versions of the predicates that are computationally equivalent but provide better performance.

The logical plan generation module 530 generates a logical plan for the database query. The logical plan includes representation of the various steps that need to be executed for processing the database query. According to an embodiment, the logical plan generation module 530 generates an unresolved logical plan based on the transformed query graph representation. Various relation names (or table names) and column names may not be resolved in an unresolved logical plan. The logical plan generation module 530 generates a resolved logical plan from the unresolved logical plan by resolving the relation names and column names in the unresolved logical plan. The logical plan generation module 530 further optimizes the resolved logical plan to obtain an optimized logical plan.

The physical plan generation module 540 generates a physical plan from the logical plan generated by the logical plan generation module 530. The physical plan specifies details of how the logical plan is executed by the data processing service 102. The physical plan generation module 540 may generate different physical plans for the same logical plan and evaluate each physical plan using a cost model to select the optimal physical plan for execution. The physical plan further specifies details of various operations of the logical plan. As an example, if the logical plan includes a join operator, the physical plan may specify the type of join that should be performed for implementing the join operator. For example, the physical plan may specify whether the join operator should be implemented as a hash join, merge join, or sort join, and so on. The physical plan may be specific to a database system, whereas the logical plan may be independent of database systems and may be executed on any target database system by converting to a physical plan for that target database system.

The code generator 550 generates code representing executable instructions for implementing the physical plan for executing a database query. The generated code includes a set of instructions for each operator specified in the execution plan. The generated code is specified using a programming language that may be compiled and executed.

System Architecture of Access Control Module

Figure 6:
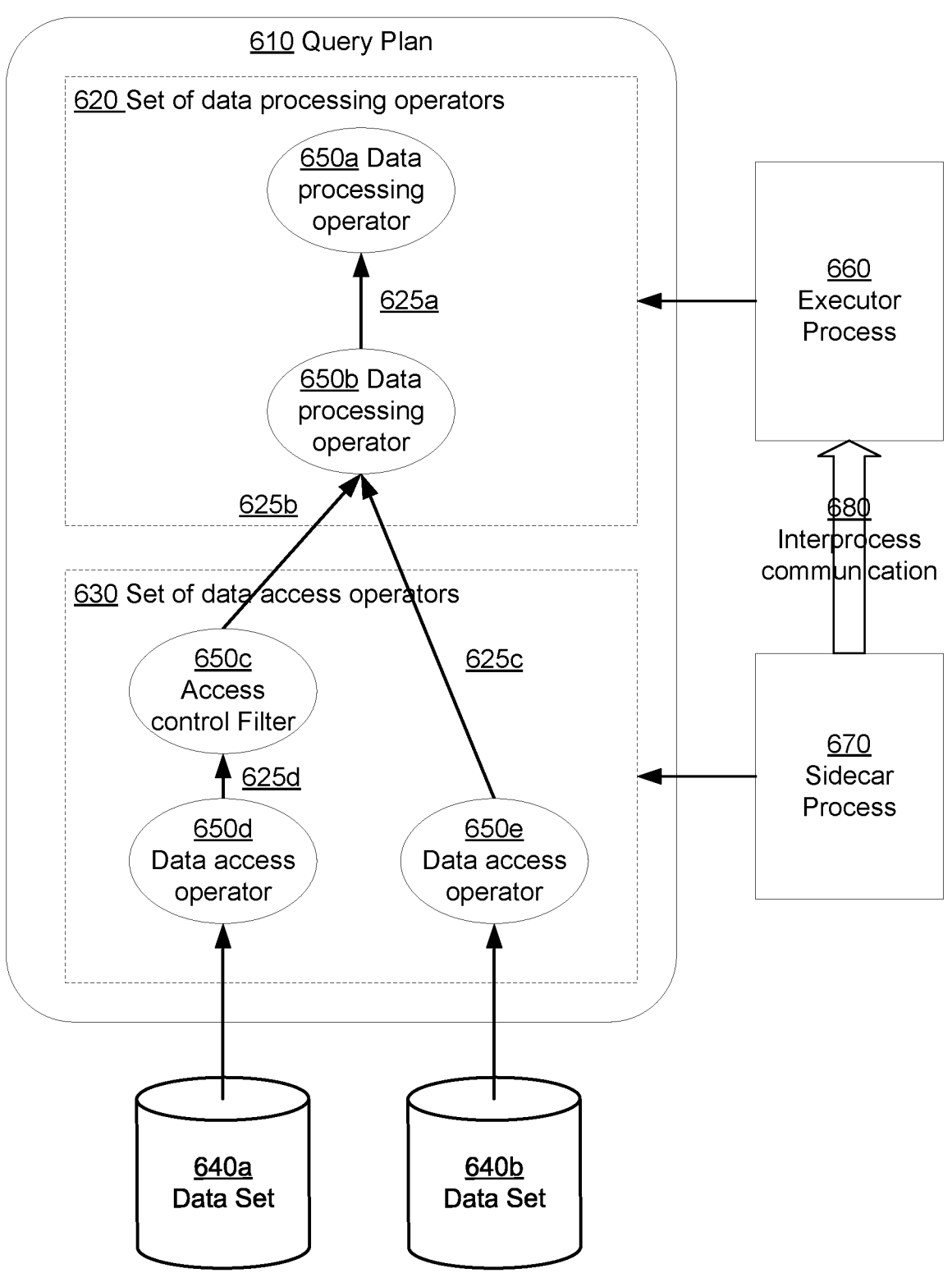
FIG. 6 shows the system architecture of the access control module, in accordance with an embodiment.

FIG. 6 illustrates a query plan generated from a database query and processes for executing the query, in accordance with an embodiment. The database query may process one or more datasets 640*a*, 640*b*. The query plan 610 is generated by compiling the database query. The query plan includes nodes corresponding to database operators and edges representing connections between nodes. For example, the query plan 610 includes nodes corresponding to database operators 650*a*, 650*b*, 650*c*, 650*d*, 650*e* and edges 625*a*, 625*b*, 625*c*, 625*d*. An edge 625 going from node 650*m* to 650*n* indicates that the output of the database operator corresponding to node 650*m* is provided as input to the database operator corresponding to node 650*n*.

The database query may be executed using a cluster of nodes, for example, an Apache Spark™ cluster. The datasets 640*a*, 640*b* may be stored in a storage system, for example, Amazon S3™ that provides an object storage service. A database operator may be a data access operator that accesses data from a dataset 640*a*, 640*b*. A database operator may be a data processing operator that receives data from a data access operator or a data processing operator. For example, the output of the data access operator 650*e* is provides as input to the data processing operator 650*b* via edge 625*c*. The output of the data processing operator 650*d* is provides as input to the data processing operator 650*a* via edge 625*a*. According to an embodiment, the data access operators are leaf nodes of the query plan, and the data processing operators are non-leaf nodes of the query plan. The node represented by the data processing operator 650*a* is a root node that does not provide data to any other data processing node and accordingly generates the result of the database query that is sent to the client that sent the database query for processing.

Examples of data processing operators include join operators that may perform sort join, merge join, nested loop join and so on. The data access operator may correspond to a scan operator. The data processing operators may include select operator that selects one of more columns of a dataset. The data processing operator may compute an expression, for example, for evaluating a condition or for determining a value of a result. A data processing operator may execute a function that may be a built-in function supported by the database or a user defined function that is provided by the user and may be implemented using a programming language that is distinct from the database query language.

A node may represent an access control filter, for example, access control filter that is inserted by the query processing module 335 in the query plan to implement the access control policy. The data of the dataset 640*a* is accessed by the data access operator 650*d* and provided to the access control filter 650*c* via the edge 625*d*. A subset of the data of the dataset 640*a* that was accessed by the data access operator 650*d* is provided as input to the data processing operator 650*b* via edge 625*b* after being filtered by the access control filter 650*c*.

As shown in FIG. 6, the query plan is divided into two sets of database operators, a set 630 of data access operators that include the access control filters also and a set 620 of data processing operators. The data processing service 102 executes the query plan using two types of processes, executor processes 660 and sidecar processes 670. The query plan may be divided across multiple executor nodes as shown in FIG. 4. Each executor node may include one executor process 660 and one sidecar process 670. A sidecar process 670 may also be referred to herein as a helper process. According to an embodiment, the executor process 660 is executed in a container that includes the sidecar process as a helper process. The sidecar process 670 and the executor processes 660 communicate using interprocess communications 680, for example, pipes, message passing, sockets, and so on.

Process of Query Compilation

Figure 7:
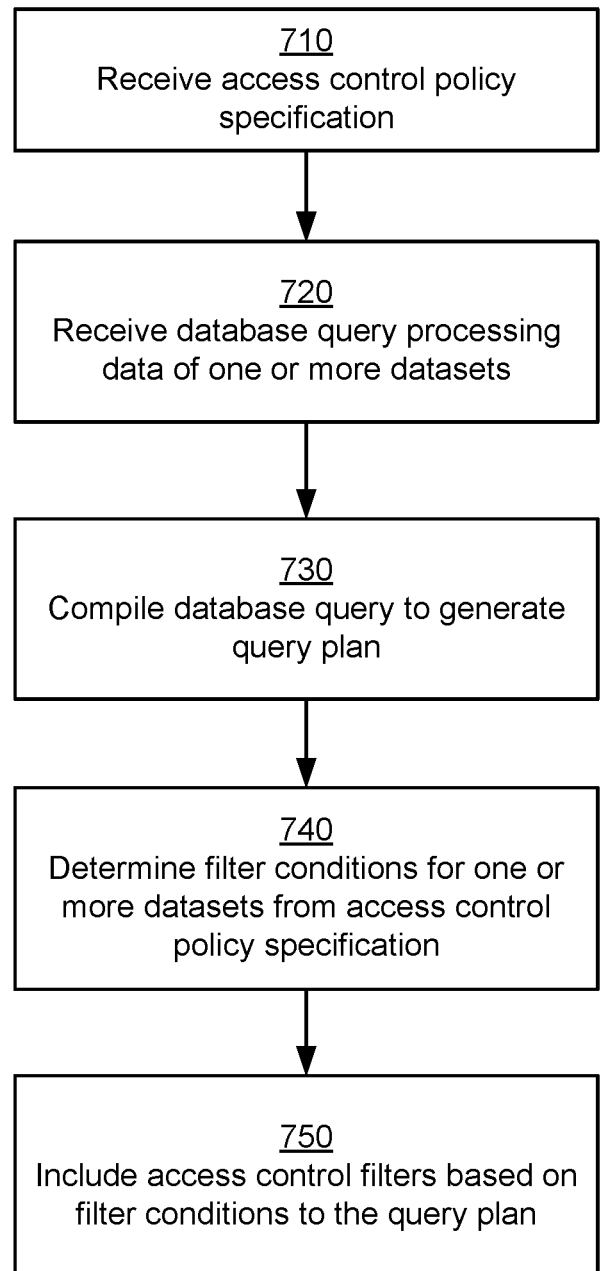
FIG. 7 illustrates the various type of data representations generated by the access control module, in accordance with an embodiment.

FIG. 7 is a flowchart of a method for synchronizing access control policies across multiple data platforms, in accordance with an embodiment. The process shown in FIG. 7 may be performed by one or more components (e.g., the query processing module 335 of the control layer 106) of a data processing system/service (e.g., the data processing service 102). Other entities may perform some or all of the steps in FIG. 7. The data processing service 102 as well as the other entities may include some or of the component of the machine (e.g., computer system) described in conjunction with FIG. 9. Embodiments may include different and/or additional steps, or perform the steps in different orders.

The data processing service 102 receives 710 an access control policy specification that specifies the access control policy. The access control policy specification may specify conditions associated with data access for users. According to an embodiment, the conditions are specified as expressions based on attributes describing the data. For example, the attribute may be a column or field of the data or the attribute may be a tag associated with the data. For example, an attribute may be a tag that specifies whether a field of the dataset includes PII. According to an embodiment, the conditions in the access control policy specification are specified using the syntax conforming to the database query language used for specifying database queries processed by the data processing service 102, for example, SQL (structured query language).

The query processing module 335 receives 720 a database query for processing. The database query may be received from a client, for example, a client application running on a client device. The client is associated with a user and the query processing module 335 processes the database query in accordance with the access control policy. Accordingly, the database query is executed to generate results such that the user is provided results only based on the subset of data that the user has access to according to the access control policy.

The query processing module 335 compiles 730 the database query to generate a query plan, for example, a query plan similar to that illustrated in FIG. 6. The query plan includes a set of database operators. According to an embodiment, the query plan is a graph made up of nodes representing database operators and edges connecting the database operators. The graph corresponding to a database query may include an edge E from a database operator O1 to a database operator O2 indicating that the output generated by the database operator O1 is provided as input to the database operator O2. The query plan may include one or more root nodes such that there are no outgoing edges connecting a root node to another database operator. A root node generates results of the database query that are sent to the client.

According to an embodiment, the query plan includes one or more data access operators and one or more data processing operators. The data access operators access data from datasets that may be stored on a storage system, for example, a file in a file system. The data access operators are leaf nodes of the query plan, and the data processing operators are no leaf nodes of the query plan that receive data processed by the data access operators.

The query processing module 335 determines 740 filter conditions based on access control policies specified in the access control policy specification. The filter conditions include instructions to determine a subset of data of a dataset, for example, a file. The subset of data represents the data of the dataset that is accessible to the user providing the database query according to the access control policy.

The query processing module 335 includes 750 access control filters in the query plan based on the filter conditions. For example, the query processing module 335 may determine that the subset of data of dataset D1 stored in file F1 that is accessible to the user is determined using a condition C1. The query processing module 335 generates an access control filter F1 based on the conditions C1. The query processing module 335 identifies the data access operator O1 of the query plan that accesses data of the dataset D1. Assume that the data access operator O1 has an edge going from the data access operator O1 to a data processing operator O2. The query processing module 335 modifies the query plan by inserting the access control filter F1 between the data access operator O1 and the data processing operator O2. Accordingly, the output of the data access operator O1 is filtered by the access control filter F1 to generate a subset S1 of data of the dataset D1. The subset S1 represents a subset of data of the dataset D1 that is accessible to the user according to the access control policy. The subset S1 is fed as input to the data processing operator O2. Similarly, the query processing module 335 may insert an access control filter for an output of every data access operator that processes a dataset identified in the access control policy specification such that the user has access to only a subset of the data of the dataset. If the access control policy does not restrict access to data of a dataset for the user, the query processing module 335 does not insert any access control filter to restrict the output of the data access operator accessing data of that dataset. Accordingly, if the access control policy does not restrict access to data of a dataset for the user, the query plan directly feeds the data output by the corresponding data access operator to one or more data processing operators.

Process of Query Execution

Figure 8:
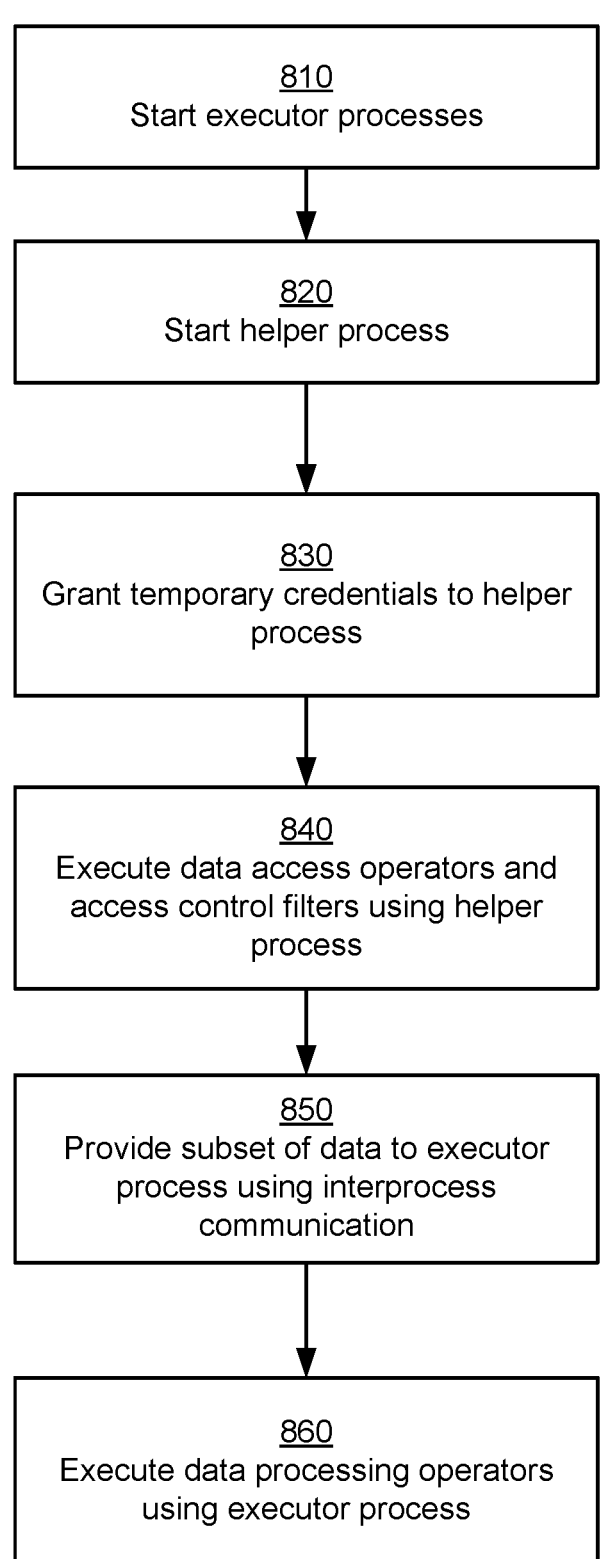
FIG. 8 is a flowchart of a method for synchronizing access control policies across multiple data platforms, in accordance with an embodiment.

FIG. 8 is a flowchart of a method for synchronizing access control policies across multiple data platforms, in accordance with an embodiment. The process shown in FIG. 8 may be performed by one or more components (e.g., the executor node of the cluster computing system 402) of a data processing system/service (e.g., the data processing service 102). Other entities may perform some or all of the steps in FIG. 8. The data processing service 102 as well as the other entities may include some or of the component of the machine (e.g., computer system) described in conjunction with FIG. 9. Embodiments may include different and/or additional steps or perform the steps in different orders.

According to an embodiment, the query processing module 335 compiles the database query according to the process shown in FIG. 7 and distributes the query plan across a plurality of executor nodes. Alternatively, the query plan may be executed by a single executor node. The executor node starts 810 the executor process 660 and starts 820 a helper process, for example, sidecar process 670. The helper process communicates with the executor process using an interprocess communication mechanism 680.

According to an embodiment, the driver node 450 provides temporary credentials to the helper process. The temporary credentials allow the helper process with temporary access to one or more datasets being processed by the database query. The temporary credentials typically provide coarse grained access to the dataset, for example, access to entire data stored in a file storing the dataset. The helper process 840 uses the temporary credentials to get access to the datasets and executes 840 the data access operators of the query plan that process the data of those datasets. The helper process 840 may execute 840 any access control filter associated with the data access operator if the data of the dataset needs to be filtered by the access control filter according to the access control policy. The helper process obtains the subset of data of the dataset as determined by executing the access control filter and provides 850 the subset of data to the corresponding executor process connected to the data access filter via the access control filter. The executor process executes 860 the data processing operator that receives the filtered data obtained from the data access operator. The executor process may continue executing the query plan, for example by providing the result of executing a data processing operator to another data processing operator if available.

Computer Architecture

Figure 9:
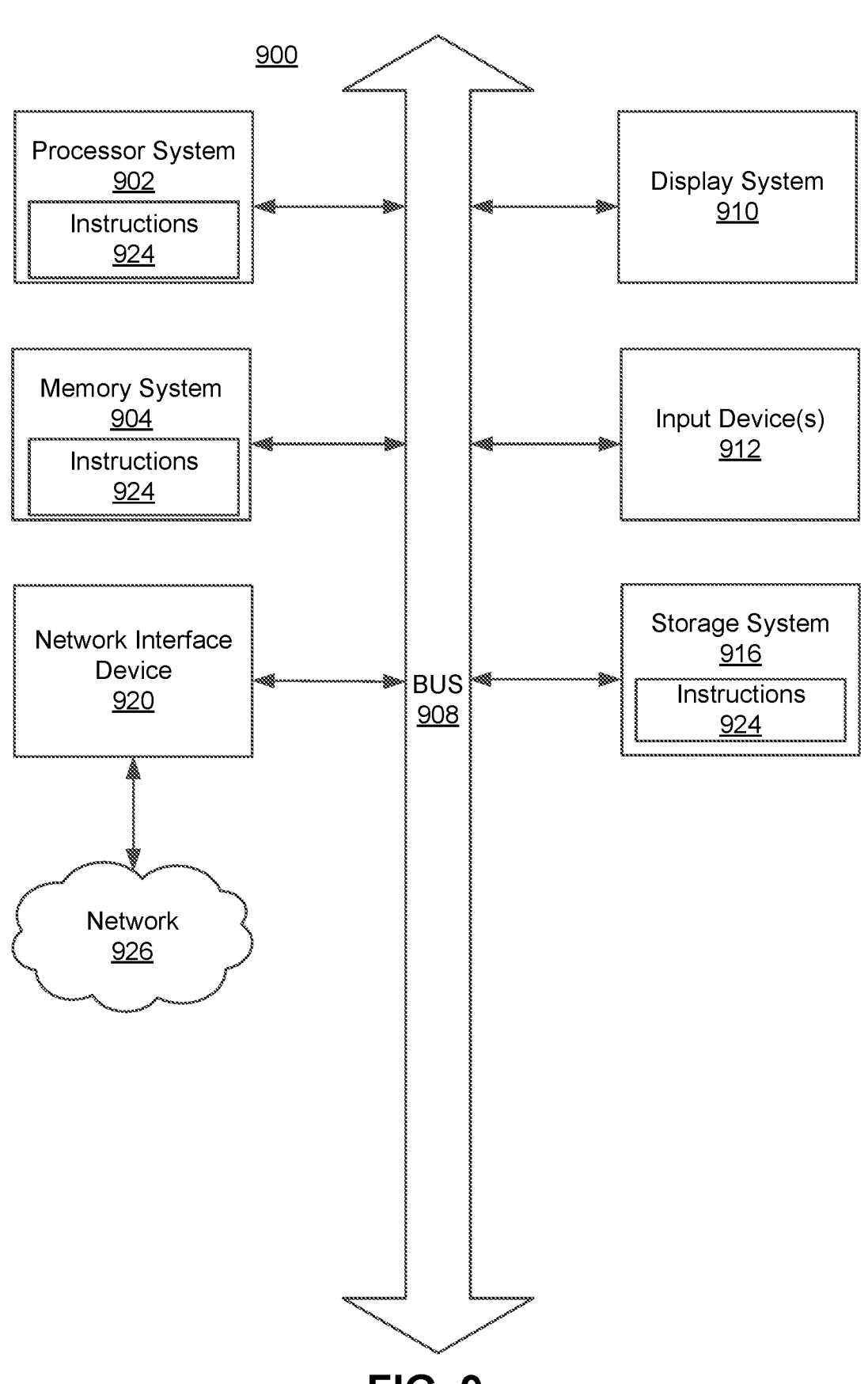
FIG. 9 illustrates an example machine to read and execute computer readable instructions, in accordance with an embodiment.

Turning now to FIG. 9, illustrated is an example machine to read and execute computer readable instructions, in accordance with an embodiment. Specifically, FIG. 9 shows a diagrammatic representation of the data processing service 102 (and/or data processing system) in the example form of a computer system 900. The computer system 900 is structured and configured to operate through one or more other systems (or subsystems) as described herein. The computer system 900 can be used to execute instructions 924 (e.g., program code or software) for causing the machine (or some or all of the components thereof) to perform any one or more of the methodologies (or processes) described herein. In executing the instructions, the computer system 900 operates in a specific manner as per the functionality described. The computer system 900 may operate as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The computer system 900 may be a server computer, a client computer, a personal computer (PC), a tablet PC, a smartphone, an internet of things (IoT) appliance, a network router, switch or bridge, or other machine capable of executing instructions 924 (sequential or otherwise) that enable actions as set forth by the instructions 924. Further, while only a single machine is illustrated, the term "machine" shall also be taken to include any collection of machines that individually or jointly execute instructions 924 to perform any one or more of the methodologies discussed herein.

The example computer system 700 includes a processing system 902. The processor system 902 includes one or more processors. The processor system 902 may include, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The processor system 902 executes an operating system for the computing system 900. The computer system 900 also includes a memory system 904. The memory system 904 may include or more memories (e.g., dynamic random access memory (RAM), static RAM, cache memory). The computer system 900 may include a storage system 916 that includes one or more machine readable storage devices (e.g., magnetic disk drive, optical disk drive, solid state memory disk drive).

The storage unit 716 stores instructions 724 (e.g., software) embodying any one or more of the methodologies or functions described herein. For example, the instructions 724 may include instructions for implementing the functionalities of the transaction module 330 and/or the file management module 335. The instructions 924 may also reside, completely or at least partially, within the memory system 904 or within the processing system 902 (e.g., within a processor cache memory) during execution thereof by the computer system 700, the main memory 904 and the processor system 902 also constituting machine-readable media. The instructions 924 may be transmitted or received over a network 926, such as the network 926, via the network interface device 920.

The storage system 916 should be taken to include a single medium or multiple media (e.g., a centralized or distributed database, or associated caches and servers communicatively coupled through the network interface system 920) able to store the instructions 724. The term "machine-readable medium" shall also be taken to include any medium that is capable of storing instructions 724 for execution by the machine and that cause the machine to perform any one or more of the methodologies disclosed herein. The term "machine-readable medium" includes, but not be limited to, data repositories in the form of solid-state memories, optical media, and magnetic media.

In addition, the computer system 900 can include a display system 910. The display system 910 may driver firmware (or code) to enable rendering on one or more visual devices, e.g., drive a plasma display panel (PDP), a liquid crystal display (LCD), or a projector. The computer system 900 also may include one or more input/output systems 912. The input/output (IO) systems 912 may include input devices (e.g., a keyboard, mouse (or trackpad), a pen (or stylus), microphone) or output devices (e.g., a speaker). The computer system 900 also may include a network interface system 920. The network interface system 920 may include one or more network devices that are configured to communicate with an external network 926. The external network 926 may be a wired (e.g., ethernet) or wireless (e.g., WiFi, BLUETOOTH, near field communication (NFC).

The processor system 902, the memory system 904, the storage system 916, the display system 910, the IO systems 912, and the network interface system 920 are communicatively coupled via a computing bus 908.

Additional Considerations

The foregoing description of the embodiments of the disclosed subject matter have been presented for the purpose of illustration; it is not intended to be exhaustive or to limit the disclosed embodiments to the precise forms disclosed. Persons skilled in the relevant art can appreciate that many modifications and variations are possible in light of the disclosed subject matter.

Some portions of this description describe various embodiments of the disclosed subject matter in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosed subject matter may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the present disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosed embodiments be limited not by this detailed description, but rather by any claims that issue on an application based hereon. Accordingly, the disclosure of the embodiments of the disclosed subject matter is intended to be illustrative, but not limiting, of the scope of the subject matter, which is set forth in the following claims.

What is claimed is:

1. A method of managing access control for database queries, the method comprising:

receiving an access control policy specification of an access control policy comprising a condition specified as an expression based on one or more attributes describing data of a first dataset of a database;

receiving a database query for processing data obtained from one or more datasets comprising the first dataset;

compiling the database query to generate a query plan in accordance with the access control policy, the query plan comprising:

one or more data access operators, each data access operator configured to access a dataset of the database, one or more data processing operators, each data processing operator configured to process at least a subset of data accessed by a data access operator, and an access control filter that determines a subset of data accessed by a data access operator from a dataset and provides as input to a data processing operator, the subset of data determined according to the access control policy, the access control filter configured to determine a subset of data of the first dataset according to the condition of the first dataset;

executing the query plan using at least an executor process and a helper process, wherein the helper process executes a data access operator and a corresponding data access filter and the executor process executes one or more data processing operators, wherein the executor process and the helper process are prevented from accessing the one or more datasets before executing the query plan; and providing temporary credentials to the helper process for accessing datasets processed by the database query for executing the query plan, wherein the temporary credentials provide access to more data of a dataset than is permitted by the access control policy.

2. The method of claim 1, further comprising:

generating the access control filter according to the access control policy specification.

3. The method of claim 2, wherein the access control filter processes data of a first data access operator processing the first dataset.

4. The method of claim 1, wherein data accessed by a first data access operator configured to access the first dataset is provided to a data processing operator without an access control filter if the access control policy specification does not include any condition based on attributes of the first dataset.

5. The method of claim 1, wherein the helper process provides the subset of data of the dataset obtained by executing the data access operator and the corresponding data access filter to the executor process using an interprocess communication mechanism.

6. The method of claim 1, wherein the dataset is stored in a file and the temporary credentials grant access to the helper process to all data of the file.

7. The method of claim 1, wherein the access control policy requires at least a first subset of data to be masked before providing to a user, wherein a first access control filter includes instructions to mask the first subset of data.

8. The method of claim 1, wherein the access control policy implements one or more of:

row level access to a dataset;

column level access to a dataset; or access to data with masking.

9. A non-transitory computer readable storage medium comprising stored program code, the stored program code comprising instructions, the instructions when executed by one or more computer processors, cause the one or more computer processors to:

receive an access control policy specification of an access control policy comprising a condition specified as an expression based on one or more attributes describing data of a first dataset of a database;

receive a database query for processing data obtained from one or more datasets comprising the first dataset;

compile the database query to generate a query plan in accordance with the access control policy, the query plan comprising:

one or more data access operators, each data access operator configured to access a dataset of the database, one or more data processing operators, each data processing operator configured to process at least a subset of data accessed by a data access operator, and an access control filter that determines a subset of data accessed by a data access operator from a dataset and provides as input to a data processing operator, the subset of data determined according to the access control policy, the access control filter configured to determine a subset of data of the first dataset according to the condition of the first dataset;

execute the query plan using at least an executor process and a helper process, wherein the helper process executes a data access operator and a corresponding data access filter and the executor process executes one or more data processing operators, wherein the executor process and the helper process are prevented from accessing the one or more datasets before executing the query plan; and provide temporary credentials to the helper process for accessing datasets processed by the database query for executing the query plan, wherein the temporary credentials provide access to more data of a dataset than is permitted by the access control policy.

10. The non-transitory computer readable storage medium of claim 9, wherein the instructions further cause the one or more computer processors to:

generate the access control filter according to the access control policy specification.

11. The non-transitory computer readable storage medium of claim 10, wherein the access control filter processes data of a first data access operator processing the first dataset.

12. The non-transitory computer readable storage medium of claim 10, wherein data accessed by a first data access operator configured to access the first dataset is provided to a data processing operator without an access control filter if the access control policy specification does not include any condition based on attributes of the first dataset.

13. The non-transitory computer readable storage medium of claim 9, wherein the access control policy implements one or more of:

row level access to a dataset;

column level access to a dataset; or access to data with masking.

14. The non-transitory computer readable storage medium of claim 9, wherein the helper process provides the subset of data of the dataset obtained by executing the data access operator and the corresponding data access filter to the executor process using an interprocess communication mechanism.

15. The non-transitory computer readable storage medium of claim 9, wherein the dataset is stored in a file and the temporary credentials grant access to the helper process to all data of the file.

16. The non-transitory computer readable storage medium of claim 9, wherein the access control policy requires at least a first subset of data to be masked before providing to a user, wherein a first access control filter includes instructions to mask the first subset of data.

17. A computer system comprising:

one or more computer processors; and a non-transitory computer readable storage medium comprising stored program code, the stored program code comprising instructions, the instructions when executed by the one or more computer processors, cause the one or more computer processors to:

receive an access control policy specification of an access control policy comprising a condition specified as an expression based on one or more attributes describing data of a first dataset of a database;

receive a database query for processing data obtained from one or more datasets comprising the first dataset;

compile the database query to generate a query plan in accordance with the access control policy, the query plan comprising:

one or more data access operators, each data access operator configured to access a dataset of the database, one or more data processing operators, each data processing operator configured to process at least a subset of data accessed by a data access operator, and an access control filter that determines a subset of data accessed by a data access operator from a dataset and provides as input to a data processing operator, the subset of data determined according to the access control policy, the access control filter configured to determine a subset of data of the first dataset according to the condition of the first dataset;

execute the query plan using at least an executor process and a helper process, wherein the helper process executes a data access operator and a corresponding data access filter and the executor process executes one or more data processing operators, wherein the executor process and the helper process are prevented from accessing the one or more datasets before executing the query plan; and provide temporary credentials to the helper process for accessing datasets processed by the database query for executing the query plan, wherein the temporary credentials provide access to more data of a dataset than is permitted by the access control policy.

18. The computer system of claim 17, wherein the instructions further cause the one or more computer processors to:

generate the access control filter according to the access control policy specification.

19. The computer system of claim 18, wherein the access control filter processes data of a first data access operator processing the first dataset.

20. The computer system of claim 18, wherein data accessed by a first data access operator configured to access the first dataset is provided to a data processing operator without an access control filter if the access control policy specification does not include any condition based on attributes of the first dataset.

* * * * *